United States Patent [19]

Mabon

[11] 4,422,113
[45] Dec. 20, 1983

[54] STEPPING MOTOR DRIVE SYSTEM

[75] Inventor: Stuart P. Mabon, Los Angeles, Calif.

[73] Assignee: Microcpolis Corporation, Chatsworth, Calif.

[21] Appl. No.: 263,039

[22] Filed: May 12, 1981

[51] Int. Cl.³ .............................. G11B 21/08
[52] U.S. Cl. .................... 360/78; 310/49 R
[58] Field of Search ............ 360/78, 76, 106, 109, 360/97–99; 318/687; 310/49 R

[56] References Cited

U.S. PATENT DOCUMENTS

| | | | |
|---|---|---|---|
| 3,737,883 | 6/1973 | Sordello et al. | 360/78 |
| 3,972,535 | 8/1976 | Bleiman | 310/49 R X |
| 4,048,531 | 9/1977 | Buess et al. | 310/49 R |
| 4,359,763 | 11/1982 | Hoffman | 360/78 X |

*Primary Examiner*—John H. Wolff
*Attorney, Agent, or Firm*—Poms, Smith, Lande & Rose

[57] ABSTRACT

The track-to-track access time of a floppy disk memory drive unit may be decreased in an inexpensive manner by operating a simple four phase permanent magnet stepper motor as a two phase brushless D.C. motor during track-to-track, high speed or "slewing" action. Included in the system are (1) single phase holding for increased accuracy, (2) sensing for two phase motor synchronization with one of the unused phase coils, and (3) speed control limiting by pulse width braking action.

15 Claims, 8 Drawing Figures

STEPPING MOTOR DRIVE SYSTEM

FIELD OF THE INVENTION

This invention relates to high speed, inexpensive arrangements for shifting magnetic heads from one magnetic memory track to another.

BACKGROUND OF THE INVENTION

Flexible disks having a coating of magnetic material are widely used for the storage of digital information. These disks, known as "floppy" disks, are normally stored in conventional types of files in a lightweight cardboard or heavy paper envelope, which permits the floppy disk to be rotated and accessed while it remains in its container. Floppy disk drives, which are made by many manufacturers, rotate the disks while a magnetic head is in contact with the surface of the disk, for "reading" or "writing" magnetically coded information on its surface. The floppy disk drive also includes arrangements for shifting the magnetic head radially to successive "tracks" which define adjacent circular paths on the surface of the magnetic disk. The radial position of the magnetic head may be determined by a lead screw, for example, which may be rotated by the stepper motor. For a number of years, the spacing between adjacent tracks was in the order of 48 tracks per inch; but in the last few years, the track density has been increased, in many manufacturers' floppy disk drives, to in the order of 96 or 100 tracks per inch, and these higher density track systems are known as "double density" systems. These double density systems were pioneered by the assignee of the present invention, and one such system is disclosed in U.S. patent application Ser. No. 863,309, filed Dec. 22, 1977, and in the continuation patent application filed May 25, 1979, under Ser. No. 042,721, with both cases being entitled "High Precision Floppy Disk Memory System".

Now, in shifting from one track to another track in floppy disk systems of the type noted hereinabove, the normal track-to-track access speed is approximately 30 milliseconds. While somewhat higher track-to-track access speeds have been accomplished, they have usually been used with the lower track density systems, and have required expensive high accuracy stepper motors and have used lower accuracy and repeatability cam or band positioners. Further, these high speed track shifting arrangements have proved to be marginal in the double density systems. For the high density systems, increased speed has been accomplished using very expensive systems including "add-on" sensors in conjunction with closed loop positioning systems and active damping systems, all of which makes for a very expensive system.

Accordingly, a principal object of the present invention is to increase the track-to-track access of high density floppy disk memory systems without significantly increasing their cost.

A subordinate object of the present invention is to accomplish the foregoing object using the simple available geometry of a four-phase permanent magnetic stepper motor.

SUMMARY OF THE INVENTION

In accordance with the present invention, the track-to-track access speed of a floppy disk memory system may be significantly increased by arrangements for driving a conventional type four phase permanent magnetic stepping motor to operate in the mode of the two phase brushless direct current motor. Further, the timing for the two energization phases is controlled by sensing through one of the other, unused, coils of the four phase stepping motor.

Other features of the invention include (1) using the two coils in one of the two sections of a conventional stepper motor as the motive coils for the two phase brushless direct current motor mode, and employing the other section of the stepper motor for the "hold" function and for sensing rotor position to control energization of the motive coils; (2) the inclusion of speed limiting arrangements for controlling the maximum velocity of the motor; (3) deceleration arrangements involving the application of a reverse pulse of a predetermined duration to the motive coils to bring the unit to a stop; and (4) the provision of additional digital control circuitry for shifting the magnetic head of the floppy disk drive by the desired number of tracks.

In accordance with a collateral feature of the invehtion, the speed of the motor may be limited by providing a minimum width pulse to the motive coils, when the motor is operated as a brushless D.C. motor. As the speed increases, the normal pulse width for continued maximum acceleration would normally become shorter and shorter. With at least a minimum pulse width always present, however, once the speed exceeds a predetermined level where the optimum acceleration pulse would be shorter than the minimum pulse width, then the prolonged pulse will provide some braking action during each cycle, thereby preventing further accelration.

The system of the present invention provides the advantage of track-to-track access speeds of about 10 milliseconds, as compared with 30 milliseconds which is generally found in the industry in the absence of the special and very expensive, collateral equipment mentioned hereinabove.

Other objects, features and advantages of the present invention will become apparent from a consideration of the following detailed description and from the accompanying drawings.

BRIEF DESCRIPTION OF THE DRAWINGS

FIG. 4 is a diagrammatic showing of the energization circuitry of a conventional four phase permanent magnet stepper motor;

FIG. 5 is a torque versus angle diagram for a four phase stepper motor;

DETAILED DESCRIPTION

Figure 6:
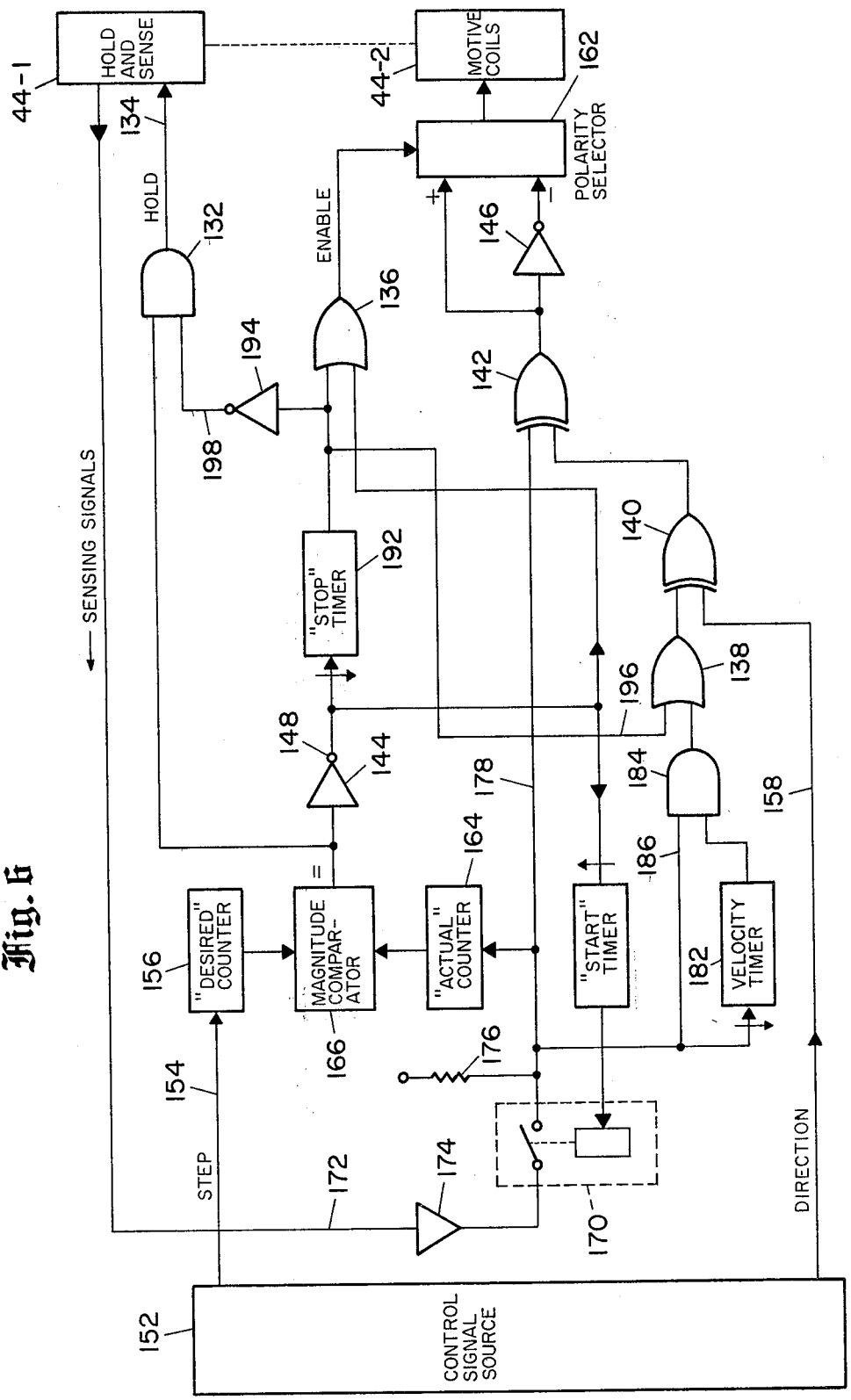
FIG. 6 is a simplified block circuit diagram of one illustrative circuit implementing the principles of the present invention.
Figure 7A:
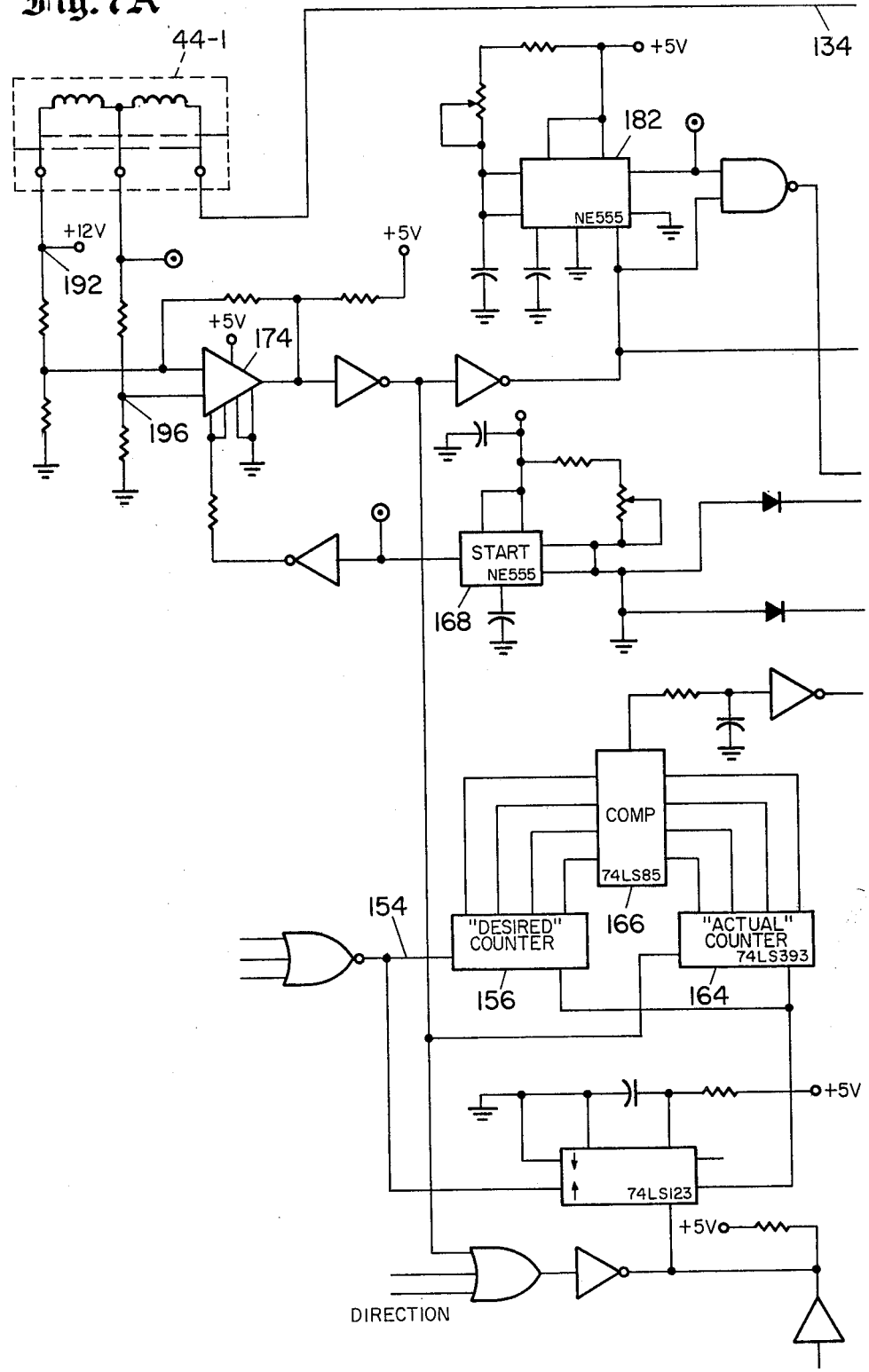
FIGS. 7(A,B) is a detailed logic circuit diagram of the circuit of FIG. 6.
Figure 7B:
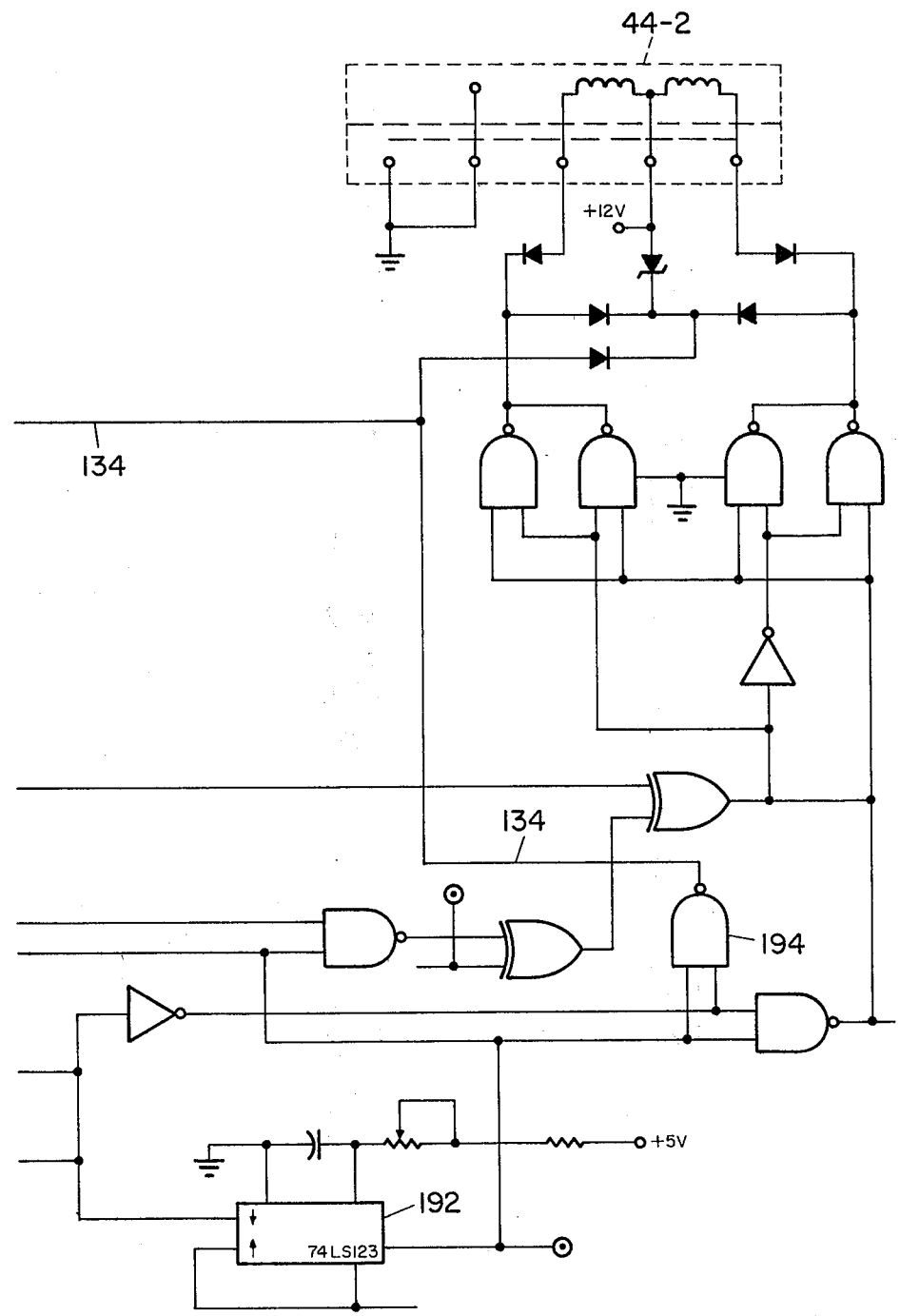

Referring more particularly to the drawings, it may be noted that the first five figures of the drawings are essentially background, but important background, information necessary for a full understanding and delineation of the actual invention, which is primarily disclosed in FIGS. 6 and 7 of the drawings.

Figure 1:
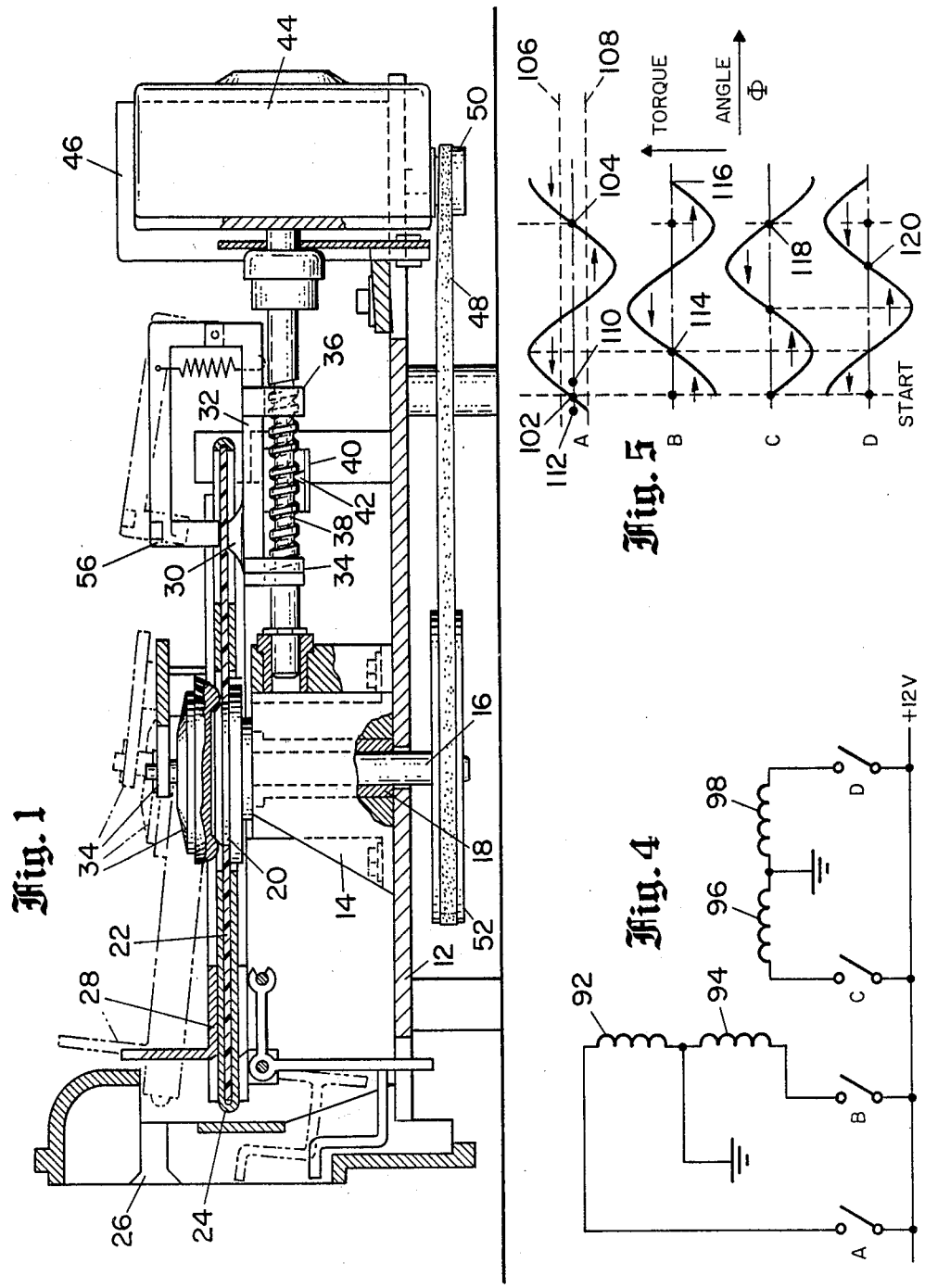
FIG. 1 is a cross-sectional view through a floppy disk drive of the type to which the present invention is applicable.

FIG. 1 is a partial cross-sectional view of a floppy disc drive unit which is more fully described in connection with the patent applications cited hereinabove. In brief, the floppy disc drive unit as shown in FIG. 1 includes a base plate 12, a central mounting block 14 in which a shaft 16 is mounted in a bearing 18. At the upper end of the shaft 16 is a hub 20 on which the floppy disc 22 is mounted. The floppy disc 22 and its enclosing heavy paper or lightweight cardboard container 24 are slid into the unit through a slot 26 when the carrier 28 is in its position where it is tilted upwardly. The magnetic head 30 is shown in engagement with the lower surface of the floppy disc 22. The magnetic head 30 is mounted on a carriage 32 which has two U-shaped members 34 and 36 which slide on the outer surface of the hardened and ground lead screw 38. A leaf spring 40 mounted on carriage 32 and carrying a tapered pin 42, controls the radial positioning of the magnetic head 30 from the center of the hub 20 on which the floppy disc 22 is mounted.

The floppy disc drive of FIG. 1 is provided with two motors, a stepper motor 44, and a drive motor 46 which is hidden behind the stepper motor 44 in the showing of FIG. 1. A rubber belt 48 interconnects the two pulleys 50 and 52 to drive the shaft 16 and supply rotational movement for the floppy disc 22. Shifting from track to track is accomplished by the stepper motor 44, and the present patent application will relate primarily to the circuitry for driving the stepper motor 44. As the stepper motor 44 is actuated, the lead screw 38 is rotated and the carriage 32, located by the pin 42 shifts the radial position of the magnetic head 30 between successive tracks defining circles on the surface of the floppy disc 22.

Also shown in FIG. 1 are the clamping mechanism 54 by which the floppy disc is held firmly down onto the hub 20, preferably with an interference fit, and the member 56 which is located opposite the head 30 on the upper side of the floppy disc 22 to hold it down into engagement with the head 30.

Figure 2:
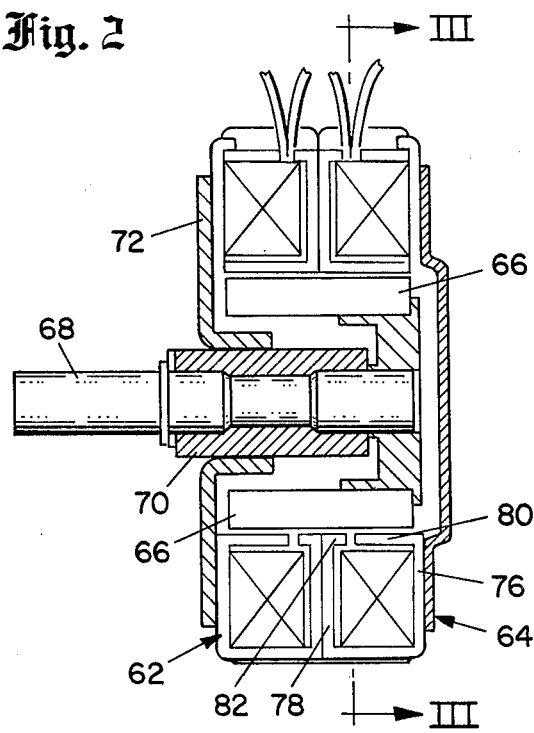
FIGS. 2 and 3 are axial and transverse cross-sectional views through a conventonal sheet metal, permanent magnet, stepping motor.
Figure 3:
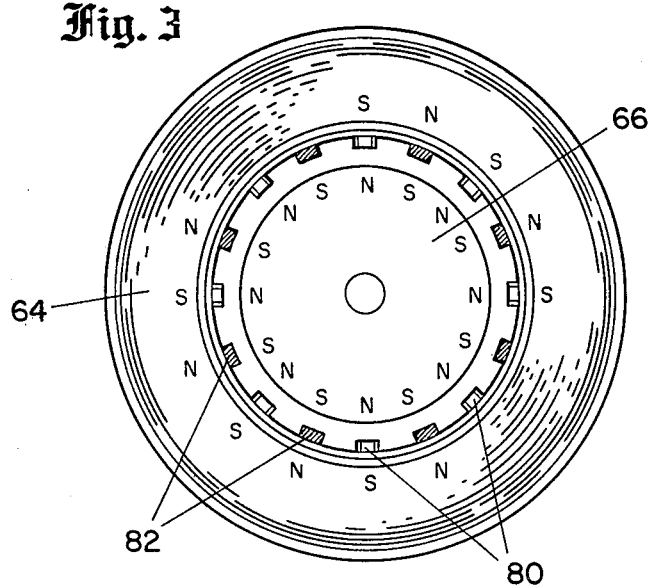

The construction of a conventional four-phase permanent magnet stepping motor will now be briefly described in connection with FIGS. 2 and 3. The motor is made of sheet metal and includes two stator sections 62 and 64, and a central permanent magnet rotor 66 mounted on a shaft 68. The shaft 68 may be mounted on bearings 70 secured to the remainder of the stator structure by an annular sheet metal member 72. Each section 62 and 64 includes a central pair of windings, and a pair of punched multi-teeth sheet metal parts. By way of example, the section 64 may include the central coil 74 and two sheet metal parts 76 and 78. The part 76 has a number of teeth 80 extending inwardly toward the opposing teeth 82 which extend toward and between the teeth 80, with both sets of teeth being adjacent the permanent magnet rotor 66. For convenience, the poles 82 in FIG. 3 are designated by the letter "N" while the poles 80 are designated by the letter "S". With the energization of the portion 64 such that the teeth 80 are magnetized to become magnetic south poles, and the teeth 82 are energized to become magnetic north poles, then the rotor assumes an angular orientation such as that indicated in FIG. 3 with the north poles around the periphery of the permanent magnet rotor 66 adjacent the south magnetized fingers or teeth 80, and the south magnetized zones on rotor 66 adjacent the north magnetized teeth 82.

With 16 fingers being present around the periphery of the rotor, the angular spacing for the section shown in FIG. 3 is 22.5 degrees. With the second section 62 being angularly displaced by 11.25 degrees from the section 64, the two sections may be alternately energized, and in successive opposite polarities for each of the two sections, to provide 11.25 degrees angular shifting per switch. The rotor 66 may be made of ceramic permanently magnetizable material which can be magnetized with many poles around its periphery as indicated in FIG. 3. For example, instead of the 16 poles, including 8 south pole zones and 8 north pole zones, as shown in FIG. 3, which provides 11.25 degrees per switch, the unit could be made with 24 poles and 2 sets of 12 interlocking fingers, to provide 7.5 degrees per switch.

The coils included in sections 62 and 64 are shown in FIG. 4. Specifically, section 62 may include two coils 92 and 94 which have their common point connected to ground. When one of the two coils is energized the teeth 80 and 82 are magnetized with one polarity, and when the other coil is energized, the teeth are magnetized with the opposite polarity. Similarly, the section 62 may be provided with two coils 96 and 98. In normal practice, in the operation of a stepper motor, the coils 92, 94, 96 and 98 are energized as indicated by the switches A, B, C and D, energizing coils 92, 96, 94 and 98 in that sequence. This will have the effect of stepping the electromagnet by successive one step increments of 11.25 degrees for the structure shown in FIG. 3, and 7.5 degrees for a 24 pole structure.

In the plots of FIG. 5, the torque versus angular position characteristic for each of the four-coil energizations is shown. Plot 5-A is the characteristic with coil 92 energized; plot 5-B is effective when coil 96 is energized; plot 5-C relates to coil 94; and the torque versus angle characteristic for coil 98 is shown in plot 5-D. Torque in one angular sense in represented by points above the axis and torque in the opposite direction by points below the axis. Accordingly, the angular step positions for the rotor in FIG. 5-A are represented by the points 102 and 104, with the directions of the torque being indicated by the arrows in FIG. 5-A, as well as in the other plots of FIG. 5.

The effect of friction is also indicated in FIG. 5-A by the dotted lines 106 and 108 representing the opposing frictional torque of the system in which the stepper motor is employed. With the rotor located between points 110 and 112, it may be noted that the frictional force or torque is greater than that provided by the stepping motor. Accordingly, there is a possibility that the rotor may be positioned at any angle between point 110 and 112 instead of precisely at point 102 which is the theoretical angular position of the stepper motor rotor.

In a similar manner, when coil 96 is energized, the two stable points for the rotor are shown at points 114 and 116 in FIG. 5-B; in FIG. 5-C the stable point is at 118; and for FIG. 5-D the stable rotor position is represented by point 120.

While it might be expected that the points 102 (FIG. 5-A), 114 (FIG. 5-B), 118 (FIG. 5-C), 120 (FIG. 5-D), and 104 (FIG. 5-A), would represent evenly spaced angular positions of the rotor as it is stepped through 360 degrees, it has been determined that this is not the case. More specifically, it has been determined that with manufacturing tolerances normally used in inexpensive stepper motors, that the angular positions corresponding to the energization of any one of the four coils are more accurately related to one another than are the positions of the intermediate points with others of the four stepper motors being energized, on a percentage error basis. Thus, the stable points 102 and 104 would be more accurately located with respect to one another, than to other stable stepper coils positions which involve energization of different coils. For example, in some cases with the coils on section 62, instead of 64, these two sections might not be displaced by the exactly desired angle, and this error would produce an undesired displacement of successive staple rotor step positions.

It is therefore desired that the same coil 92, 94, 96 or 98 of the stepping motor always be employed as the "hold" position for determining the precise location of the lead screw 38, of FIG. 1, and the resulting track position of the magnetic head 30.

It is again noted that the foregoing description is primarily intended by way of background information, and is generally comparable to the disclosure included in the prior patent application cited hereinabove. Attention will now be focused on the circuits of FIGS. 6 and 7, which represent circuits by which the principles of the present invention are implemented.

As indicated in the earlier "Summary of the Invention" section of this patent application, the present invention involves the operation of the stepper motor as a two-phase brushless motor in switching from one track to another. The method for implementation of these and other features of the invention will be brought out in connection with the description of FIGS. 6 and 7.

Now, referring to FIG. 6, the stepper motor is indicated at 44-1 and 44-2 at the right-hand side of FIG. 6. 44-1 represents one section of the stepper motor which may include two coils as shown at 92, 94 in FIG. 4, and with one of the coils being used for the "hold" function and the other being employed as a sensing coil to control the timing of the application of the pulses to the motive coils represented by the block 44-2 while the stepper motor is being operated as a two-phase brushless DC motor.

The holding signals are applied from the AND gate 132 on lead 134 to a single one of the coils included in the section of the stepper motor represented by reference numeral 44-1. Only one coil is employed for "hold", to improve the accuracy of angular positioning, for the reasons outlined hereinabove.

Incidentally, concerning the symbols which are employed in the block logic circuit diagram of FIG. 6, an AND circuit is represented by an element as shown at reference numeral 132 with a flat rear portion and a rounded front portion. An OR circuit is represented as indicated at reference numeral 136 or 138 by a symbol having a rounded back and a somewhat pointed front; while an EXCLUSIVE OR circuit is indicated as shown at symbol 140 and 142 by an element having a curved double line at its rear and a somewhat pointed forward portion. As is well known in the logic circuit field, an AND circuit gives an output signal only when all of its inputs are energized; an OR circuit gives an output signal when either or both of its input circuits are energized; and an EXCLUSIVE-OR circuit provides an output signal when either but not both of is inputs are energized. Amplifiers are indicated by triangles such as those shown at 144 and 146, and the inversion or logic signal reversal function is indicated by a small circle such as the circle 148 which appears at the output of amplifier 144.

Now, returning to the mode of operation of the circuit of FIG. 6, the "hold" lead 134 is normally energized and the stepper motor holds the magnetic head on a single track on the floppy disc. When it is desired to shift tracks, a series of pulses is supplied from the control signal source 152 on lead 154 to the counter 156. A irectional signal is supplied from the control signal source 152 on lead 158 to the exclusive OR circuit 140. The signal supplied on lead 158 determines the sequence of energization of the two motive coils of the stepper motor represented by block 44-2, and thereby controls the direction of rotation of the stepper motor and the resultant radial direction (in or out) of the magnetic head 30 (see FIG. 1). The energization of the motive coils in block 44-2 is controlled by the polarity selector circuit 162 together with the exclusive OR circuit 142 and the inverting amplifier 146.

In operation, the system is initially in the "hold" state, and an advance signal arrives as a series of pulses on lead 154. The counter 156 will then be stepped up to a level indicated by the number of tracks to be shifted, the second counter 164, which indicates actual steps taken by the stepper motor, will still be at its zero or reset condition, and the magnitude comparator 166 will give an output signal indicating "inequality" as contrasted to its other state which is produced when the two counters have identical counts therein. The resultant start signal will be applied to the timer 168 which may be a "one-shot" multi-vibrator providing an input pulse to the switching circuit 170 to block sensing signals from lead 172 and amplifier 174 during the brief initial start interval. The resistor 176 is coupled to a voltage source to provide the desired polarity signal on lead 178 to the exclusive OR circuit 142, whereby the initial acceleration pulse in the proper direction is supplied to the motive coils 44-2. Following the initial acceleration interval as determined by the start delay circuit 168, the switching circuit 170 connects the output from amplifier 174 to lead 178 so that the motive coils 44-2 are energized in synchronism with the sensing signals from one of the coils represented by block 44-1. One of the two coils in block 44-1 is employed for holding and the other for sensing.

Unless limited as disclosed below, the stepper motor, when operated as a brushless DC motor, could accelerate to an undesirable high speed. The velocity timer circuit 182 prevents this runaway action. More specifically, as the speed of the motor increases, the time interval for each of the pulses applied successively to the motive coils represented by the block 44-2, becomes smaller and smaller. The timer 182, which may be implemented by a "one-shot" multi-vibrator, provides a pulse of minimum duration to the AND gate 184. In combination with the input on lead 186 and 178 from the sensing signal amplifier 174, to both the AND gate 184 and the exclusive OR circuit 142, the result at the output of exclusive OR circuit 142 is a continuance of the signal for the period established by the velocity timer 184. As the motor accelerates to a speed at which the sensed signal from lead 172 would provide a shorter pulse for increased acceleration, the increased length of the pulse actually causes some breaking or deceleration (of the type indicated by the plots of FIG. 5), thereby limiting the maximum velocity of the stepper motor.

Finally, when the number of steps taken as indicated by the "actual" counter 164 indicates coincidence with the "desired" counter 156, the output state of the magnitude comparator 166 will change. At that point the stop timer 192 will be energized, thereby applying signals to the OR circuit 136 and through the reversing amplifier 194 to momentarily disable the AND gate 132. During the time when the pulse output from the stopped timer 192 is present, a reversal of the order of energization of the coils 144-2 will occur as a result of the signal applied on lead 196 to the OR gate 138. Following the interval defined by the output pulse from the "stop" timer 192, an enabling input will be supplied to the lower lead 198 to the AND gate 132 and lead 134 will be energized to hold the stepping motor in its new position corresponding precisely to the number of pulses supplied on lead 154 to counter 156.

FIG. 7 has been included for purposes of completeness as providing one possible detailed logic circuit implementation for the present invention. A number of the principal blocks which appear in the circuit of FIG. 6 have also been included in the circuit of FIG. 7. In view of the fact that standard logic circuit notation and designations have been employed in the circuit of FIG. 7, it could readily be followed by anyone skilled in the art, and a repetitive detailed consideration of this circuit will not be included in this specification.

In connection with FIG. 7 and the actual implementation of the system, there are a few points which are worthy of note. For example, the motive coils 44-2 are included in one section, such as section 62 (see FIG. 2) of the stepper motor and the coils 44-1 are included in the other section, such as section 64 (see FIG. 2) of the stepper motor. In order to increase the power supplied to the motive coils 44-2, the cross-section of the wire was increased (approximately doubled) as compared with the "normal" coils used in section 44-1 and this gave an increase of about 20 percent in ampere turns.

The "hold" function was implemented in FIG. 7 by connecting the two coils in section 44-1 in series, applying 12 volt power to point 192, and then selectively grounding lead 134 from the logic circuit 194 when "hold" action is appropriate. Sensing signals are picked up at point 196 from between the coils in section 44-1, as a result of the rotation of the permanent magnet rotor and the inducing of E.M.F into these coils.

Incidentally, the duration of the various timing pulses provided by the "one-shot" multi-vibrators will vary in accordance with the stopper motor inertia and other system parameters, but will normally be a few milliseconds in length.

In conclusion, it is to be understood that the foregoing description merely relates to one possible specific implementation of the invention, and that other equivalent circuits could be employed without departing from the spirit and scope of the present invention. Thus, by way of example, and not of limitation, it is well known that logic circuit elements may be implemented by many alternative circuit components, and that delay functions may be accomplished through the use of delay lines, as well as by multi-vibrator and other electrical circuit elements. Also, the "hold" function could be implemented using one coil in one of the stepper motor sections, with the other coil in the same section being used for sensing. Accordingly, the present invention is not limited to that precisely as shown and described hereinabove.

What is claimed is:

1. In a high speed, low-cost, high precision memory system,
   drive means including a four phase permanent magnet stepper motor having two sections for shifting the position of a magnetic head between storage tracks on a memory surface, said stepper motor having a stator and a rotor;
   means for energizing one section and only one section of said stepper motor to hold said rotor in a fixed position relative to said stator;
   means for energizing two motive phases of said four phase stepper motor in the other section to operate said motor in the mode of a two phase brushless direct current motor during high speed rotation of said rotor;
   means for sensing the relative position of the stator and rotor of said stepper motor from said one section of said motor; and
   means for controlling the two phase energization of said motor from said sensing means during high speed rotation of said motor.

2. A system as defined in claim 1 further including velocity control means for applying a pulse of at least a predetermined duration to one of said motive phases during high speed rotation thereof, whereby as the speed increases so that the required pulse width for further acceleration is less than said predetermined duration, some braking action will occur during each cycle to limit the velocity.

3. A system as defined in claim 1 including means for controlling the direction of rotation of said stepper motor by reversing the phase energization of said two motive phases.

4. A system as defined in claim 1 further comprising start means for initially disabling said controlling means, and for concurrently providing a fixed length acceleration signal to said motive phases.

5. A system as defined in claim 1 further comprising means for determining when said stepper motor during operation thereof is close to the desired new position and for decelerating the motor by reversing the polarity applied to said motive phases, and for thereafter energizing the "hold" section of said stepper motor.

6. A system as defined in claim 1 including:
   first and second counters;
   means for supplying signals to said first counter indicating the number of tracks to be shifted;
   means for supplying signals to said second counter indicating the number of tracks through which the stepper motor has advanced the head; and
   means for comparing the outputs of said first and second counters, and reversing the polarity of the energization of said two motive phases when the two counters have substantially the same count.

7. In a high speed, low-cost, high precision floppy disk memory system,
   floppy disk drive means including a four phase permanent magnet stepper motor having two sections for shifting the position of a magnetic head between storage tracks on the floppy disk;
   means for energizing one section and only one section of said stepper motor to hold said magnetic head on a selected track whenever said stepper motor is stopped during operation of said system;
   means for energizing two motive phases of said four phase stepper motor in the other section to operate said motor in the mode of a two phase brushless direct current motor during high speed shifting from one storage track to another track on said floppy disk;

means for providing synchronization signals indicating the relative position of the stator and rotor of said motor from said one section of said stepper motor; and means for controlling the two phase energization of said two motive phases of said motor during the high speed shifting mode, from said synchronization signals.

8. A system as defined in claim 7 further including velocity control means for applying a pulse of at least a predetermined duration to one of said motive phases during the shifting mode, whereby as the speed increases so that the required pulse width for further acceleration is less than said predetermined duration, some braking action will occur during each cycle to limit the velocity.

9. A system as defined in claim 7 including means for controlling the direction of rotation of said stepper motor by reversing the phase energization of said two motive phases.

10. A system as defined in claim 7 further comprising start means for initially disabling said controlling means, and for concurrently providing a fixed length acceleration signal to said motive phases.

11. A system as defined in claim 7 further comprising means for determining when said stepper motor during operation thereof is close to the desired new position and for decelerating the motor by reversing the polarity applied to said motive phases, and for thereafter energizing the "hold" section of said stepper motor.

12. A system as defined in claim 7 including:
first and second counters;
means for supplying signals to said first counter indicating the number of tracks to be shifted; means for supplying signals to said second counter indicating the number of tracks through which the stepper motor has advanced the head; and
means for comparing the outputs of said first and second counters and reversing the polarity of the energization of said two motive phases when the two counters have substantially the same count.

13. In a high speed, low-cost, high precision information storage system,
means, including a rotatable disk and a read and/or write head movable on the surface of said disk, for storing and/or retrieving information;
system drive means including a four phase permanent magnet stepper motor having two sections for shifting the position of said head relative to said disk;

means for energizing one section and only one section of said stepper motor to hold said head in the desired position whenever said stepper motor is stopped during operation of said system;
means for energizing two motive phases in the other section of said four phase stepper motor to operate said motor in the mode of a two phase brushless direct current motor during high speed shifting of said head from one point to another point on said disk;
means for providing synchronization signals indicating the relative position of the stator and rotor of said motor from said first section of said stepper motor; and
means for controlling the two phase energization of said two motive phases of said motor during the point-to-point shifting mode, from said synchronization signals.

14. In a high speed, low-cost, high precision memory system,
means, including at least one disk having a magnetic surface and a magnetic head movable with respect to said disk, for storing information in successive storage tracks on said disk;
drive means including a four phase permanent magnet stepper motor having two sections for shifting the position of said magnetic head on said magnetic surface;
means for energizing one section and only one section of said stepper motor to hold said magnetic head on a selected track on said magnetic surface;
means for energizing two motive phases of said four phase stepper motor in the other section to operate said motor in the mode of a two phase brushless direct current motor during high speed shifting of said head from one track to another track on said disk;
means for sensing the relative position of the stator and rotor of said motor from said one section of said motor; and
means for controlling the two phase energization of said motor during the track-to-track shifting mode from said sensing means.

15. A system as defined in claim 13 or 14 further including velocity control means for applying a pulse of at least a predetermined duration to one of said motive phases during the track-to-track shifting mode, whereby as the speed increases so that the required pulse width for further acceleration is less than said predetermined duration, some braking action will occur during each cycle to limit the velocity.

* * * * *